United States Patent
Logan

(10) Patent No.: US 10,149,008 B1
(45) Date of Patent: Dec. 4, 2018

(54) SYSTEMS AND METHODS FOR ASSISTING A USER WITH IDENTIFYING AND REPLAYING CONTENT MISSED BY ANOTHER USER BASED ON AN ALERT ALERTING THE OTHER USER TO THE MISSED CONTENT

(71) Applicant: Rovi Guides, Inc., San Carlos, CA (US)

(72) Inventor: Jonathan A. Logan, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 4 days.

(21) Appl. No.: 15/639,179

(22) Filed: Jun. 30, 2017

(51) Int. Cl.
*H04N 21/45* (2011.01)
*H04N 21/442* (2011.01)
*H04N 21/466* (2011.01)
*H04N 21/472* (2011.01)
*H04N 21/482* (2011.01)
*H04N 21/488* (2011.01)

(52) U.S. Cl.
CPC ... *H04N 21/44218* (2013.01); *H04N 21/4532* (2013.01); *H04N 21/466* (2013.01); *H04N 21/47217* (2013.01); *H04N 21/4882* (2013.01); *H04N 21/4821* (2013.01)

(58) Field of Classification Search
CPC ......... H04N 21/44218; H04N 21/4532; H04N 21/4882; H04N 21/47217; H04N 21/466; H04N 21/4821
See application file for complete search history.

(56) References Cited

U.S. PATENT DOCUMENTS

| | | | |
|---|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2010/0153885 A1 | 6/2010 | Yates |

*Primary Examiner* — Yassin Alata
(74) *Attorney, Agent, or Firm* — Haley Guiliano LLP

(57) ABSTRACT

Systems and methods are disclosed herein for automatically replaying a portion of a media asset to a first user when a second user delivers an alert to the first user, and the alert is indicative of an event shown in the portion of the media asset, which occurred while attention of the first user was diverted away from the media asset. For example, a first user may divert his or her attention away from a media asset and may miss a portion of the media asset that he or she may be interested in. A second user may tell the first user that the first user has missed out an event the first user may be interested in. A media guidance application may capture the alert, based on which a portion that matches the alert is found and may be played back to the first user.

20 Claims, 8 Drawing Sheets

SYSTEMS AND METHODS FOR ASSISTING A USER WITH IDENTIFYING AND REPLAYING CONTENT MISSED BY ANOTHER USER BASED ON AN ALERT ALERTING THE OTHER USER TO THE MISSED CONTENT

BACKGROUND

In related art systems, a user may request playback of some programs if the user misses a portion of those programs. Related art systems may present a "highlight reel" to the user to help the user catch up with the program. The catch-up content may highlight important events in the media (e.g., a goal in a live soccer game), and may skip events that are not as important (e.g., commercials during a timeout). Sometimes the user may have to view portions of the catch-up content that are replayed but are not of interest to the user. Or sometimes, the user may be forced to view the catch-up content while missing out on further live content in which the user is not interested.

SUMMARY

Systems and methods are disclosed herein for automatically replaying a portion of a media asset to a first user when a second user delivers an alert to the first user, and the alert is indicative of an event shown in the portion of the media asset, which occurred while attention of the first user was diverted away from the media asset. For example, a first user may divert his or her attention away from a media asset and may miss a portion of the media asset that he or she may be interested in. A second user may tell the first user via an alert, such as a verbal communication, an electronic communication, a physical gesture, and/or the like, that the first user has missed out an event the first user may be interested in. A media guidance application may capture the alert from the second user, based on which a portion that matches the alert is found and may be played back to the first user. In this way, by performing the automatic replaying based on another user's alert, the media guidance application will be able to enhance user experience with the media asset, e.g., the first user does not need to manually search and find a portion that he or she may be interested for playback. Moreover, as the automatic playback is analyzed and determined based on the feedback from the second user who has constant attention with the media asset, accuracy of identifying relevant portions of the media asset that the first user may be interested in is improved, and thus unnecessary playbacks can be reduced. The media guidance application also allows another user, e.g., the second user, etc., to interactively contribute to providing catch-up content to the first user, and thus enhance a collaborative watching experience among users.

To this end and others, in some aspects of the disclosure, a media guidance application may detect that attention of a first user towards a media asset has been diverted away from the media asset. For example, the media guidance application may detect that a first user is no longer in proximity of the user equipment that the media asset, e.g., a live soccer game, or the gaze of the first user has switched away from the user equipment. In response to detecting that the attention of the first user has been diverted away from the media asset, the media guidance application may identify a second user of relevance to the first user, who is in proximity to the user equipment. For example, the second user may be another user, e.g., User B, who is in the same room watching the same live soccer game with the first user.

In some embodiments, to identify the second user of relevance to the first user, the media guidance application may identify a plurality of users in proximity to the user equipment, on which the media asset is played back. For example, the media guidance application may employ a camera to capture an image or a video of the audience scene to determine who is watching the game in the room where the soccer game is played. The media guidance application may then perform facial recognition on the image or the video to identify human faces in the watching scene. The media guidance application may retrieve a plurality of profiles corresponding to the identified users. For example, the media guidance application may identify a user name corresponding to each identified human face in the watching scene, and then retrieve the corresponding user profile based on the user name. The media guidance application may determine a respective relevance level of each respective identified user with respect to the first user. For example, the media guidance application may retrieve preference information in the respective profile of each identified user, and compare such preference information with the preference information in the profile of the first user. The media guidance application may calculate the relevance level as an overlap percentage between the preference information of the first user and the preference information of another user. The media guidance application may then identify a second user who has the highest relevance level with respect to the first user as the user of relevance.

In some embodiments, upon identifying the second user of relevance to the first user, the media guidance application may monitor a level of engagement of the second user with the media asset. For example, the media guidance application may monitor whether the second user has been engaged in watching and paying attention to the media asset. The media guidance application may determine, during the monitoring, a plurality of portions of the media asset for which the level of engagement of the second user exceeds an engagement threshold. For example, the media guidance application may divide the media asset, starting from a timestamp when the level of engagement of the second user exceeds the engagement threshold, into a series of consecutive portions In some embodiments, the media guidance application may determine the engagement threshold upon the relevance level of the second user. The media guidance application may determine whether the relevance level of the second user is higher than a pre-determined relevance threshold. For example, the second user needs to be relatively more engaged in watching the soccer game in order to be considered as a user of relevance when the relevance level of the second user to the first user is relatively lower. When the relevance level of the second user is higher than the pre-determined relevance threshold, the media guidance application may assign a relatively lower value to the engagement threshold. When the relevance level of the second user is lower than the pre-determined relevance threshold, the media guidance application may assign a relatively higher value to the engagement threshold.

In some embodiments, for each respective portion of the plurality of portions, in response to determining that the level of engagement of the second user exceeds the engagement threshold, the media guidance application may annotate the respective portion of the media asset. To annotate the respective portion of the media asset, the media guidance application may identify a start time and an end time of the respective portion of the media asset. For example, the media guidance application may obtain the start time and the end time from the metadata of the media asset. The media guidance application may also determine, from the metadata, a plurality of topics corresponding to the media asset. The media guidance application may then compare each determined topic to an indication of electronic communication shared by users between the start time and the end time, and determine whether any topic is included in any electronic communication more than a threshold number of times. For example, the media guidance application may obtain electronic communications among users during the time duration of the respective portion of the media asset, and compare with each topic with such user communication to determine whether the respective topic is trending. The media guidance application may then determine attributes of the respective portion, based on words included in the electronic communications. For example, if the media guidance application determines that a topic "penalty" has appeared in social media posts for more than a threshold, e.g., 2000 times, the media guidance application may use words in the social media posts that include "penalty" to determine attributes of the respective portion of the media asset.

In some embodiments, to annotate the respective portion of the media asset, the media guidance application may group one or more preceding or the subsequent portions together with the respective portion for replay purpose. For example, when a respective portion of the soccer game includes a two-min replay of a penalty kick, users may be interested in watching more than just the penalty kick, e.g., the portion including the foul that leads to the penalty goal may also be replayed. The media guidance application may retrieve a first preceding or subsequent portion that immediately precedes or follows the respective portion. The media guidance application may then compare attributes corresponding to the respective portion with attributes corresponding to the first preceding or subsequent portion to determine an overlap percentage. When the overlap percentage is lower than an overlap threshold, the preceding or subsequent portion is not considered to be replayed together with the respective portion. Thus, the media guidance application may annotate a starting point of the respective portion as a logical starting point, or an ending point of the respective portion as a logical ending point for playing back the respective portion. When the overlap percentage is higher than the overlap threshold, the preceding or subsequent portion is considered to be replayed together with the respective portion. Then the media guidance application may keep retrieving a second preceding or subsequent portion that immediately precedes or follows the first preceding or subsequent portion, respectively. The media guidance application may repeat comparing attributes of the respective portion and attributes of the second preceding or subsequent portion to determine whether the overlap percentage exceeds the overlap threshold. When the overlap percentage is no longer higher than the overlap threshold, the media guidance application may annotate a starting point of the first preceding portion as the logical starting point, or an ending point of the first subsequent portion as the logical ending point for playing back the respective portion. The media guidance application may continue retrieving another preceding or subsequent portion until the overlap percentage is no longer higher than the overlap threshold, and may annotate more than one preceding or subsequent portions to be replayed together with the respective portion.

In some embodiments, the media guidance application may retrieve a profile corresponding to the first user from a database. The media guidance application may then generate a subset of the plurality of portions. For example, the media guidance application may compare attributes corresponding to each portion from the plurality of portions of the media asset with preference information from the profile of the first user. The media guidance application may then determine whether any attribute from the attributes matches the preference information. For example, the media guidance application may determine, based on the comparing of the attributes associated with each portion from the plurality of portions of the media asset with preference information from the profile of the first user, a portion of the media asset in which the first user is interested from the plurality of portions of the media asset. The media guidance application may then add the portion in which the first user is interested to the subset of the plurality of portions.

In some embodiments, the media guidance application may detect that the attention of the first user is no longer diverted away from the media asset. For example, the first user may physically get in proximity to the user equipment where the media asset is played, or turn his or her gaze to the user equipment. In response to detecting that the attention of the first user is no longer diverted away from the media asset, the media guidance application may monitor for an alert relating to the media asset from the second user towards the first user, and detect, during the monitoring, the alert from the second user toward the first user. For example, the media guidance application may record any voice in the background, and capture that User B articulates to User A that "you just missed the penalty goal!" The media guidance application may then extract a keyword from the voice alert, e.g., "penalty," "goal," etc. The media guidance application may determine a portion of the subset of portions of the media asset, to which the keyword corresponds. For example, for each respective portion of the subset, the media guidance application may compare attributes corresponding to the respective portion to the keyword "penalty" or "goal." If a portion of the media asset includes attributes that match the keywords, the media guidance application may identify the portion for potential playing back.

In some embodiments, prior to playing back the portion from the subset of portions of the media asset, the media guidance application may determine a projected interest level of the first user towards the portion of the media asset which matches the keyword from the alert. For example, upon determining the portion of the media asset that possibly include the keywords, the media guidance application may determine how interested the first user is to watch the playback of the portion. The media guidance application may assign a user interest matching score to the portion of the media asset based on a matching percentage from the comparison of attributes associated with the portion of the media asset with the preference information from the first profile of the first user. The media guidance application may then assign, to the portion of the media asset, a cruciality score that indicates how crucial any event included in the portion of the media asset is. For example, the cruciality score is obtained from a pre-determined cruciality table that maps terms indicative of different events to different scores indicative of cruciality levels of the different events. The media guidance application may determine the projected interest level by taking a weighted sum of the user interest matching score and the cruciality score. The media guidance application may dynamically adjust the first weight and the second weight, depending on a relative emphasis on user interests or the cruciality of the event.

In some embodiments, in response to determining the projected interest level of the first user towards the portion of the media asset is higher than a pre-determined interest threshold, the media guidance application may play back the portion of the media asset on the user equipment on which the media asset has been played back to the first user. For example, the media guidance application may temporarily interrupt the soccer game or any other program that is being played, and play back the portion on the user equipment. In response to determining that the projected interest level of the first user towards the portion of the media asset is lower than the pre-determined interest threshold, the media guidance application may temporarily refrain from playing back the portion of the media asset on the user equipment.

In some embodiments, the media guidance application may also temporarily refrain from play back the portion of the media asset, if the current program being played is crucial. To determine whether the current program being played is crucial, the media guidance application may extract one or more attributes from metadata associated with the media asset at a first time when the alert is captured. The media guidance application may then determine a first cruciality level of the media asset at the first time, for example, by retrieving one or more corresponding cruciality scores from the pre-determined cruciality table based on the one or more attributes. In response to determining that the cruciality level of the media asset at the first time is higher than a pre-determined cruciality threshold, the media asset application may refrain from playing back the portion of the media asset at the first time. The media guidance application may wait for a short period of time until a second time, and determine a second cruciality level of the media asset at the second time in a similar manner, for example, by retrieving attributes of the media asset at the second time and querying the cruciality table based on the attributes as described above. In response to determining that the second cruciality level of the media asset at the second time is lower than the pre-determined cruciality threshold, the media guidance application may play back the portion of the media asset at the second time.

In some embodiments, the media guidance may allow the second user to manually select a portion for playing back to the first user, if no portion from the subset of the plurality of portions of the media asset matches the keyword. The media guidance application may transmit, to a mobile device associated with second user a plurality of playback options representing the plurality of portions of the media asset for which the level of engagement of the second user exceeds an engagement threshold. The media guidance application may receive, from the mobile device, a selection from the plurality of playback options. For example, the second user may scroll the list of video icons, and tap on an icon for replay. The media guidance application may then play back, on the user equipment that the media asset has been played on, a selected portion from the plurality of portions of the media asset corresponding to the selection.

In some embodiments, the media guidance application may utilize monitoring data of a remote user to determine the portion for playback when no user of relevance to the first user is proximate to the first user. For example, the first user may be alone in a room watching the soccer game, or none of other users in the same room with the first user has a relevance level higher than the relevance threshold. In response to determining that no user of relevance to the first user is proximate to the first user, the media guidance application may transmit a request, to a remote server that is physically remote from the first user or the second user, for monitoring data of a third user. For example, the server may identify a third user, who has a profile that is connected to the profile of the first user and has been engaged in watching the soccer game, with a second level of engagement with the media asset that exceeds the pre-determined engagement threshold, as a user of relevance to the first user. In response to transmitting the request to the remote server, the media guidance application may receive, from the remote server, information relating to an alert relating to the media asset from the third user. The alert may be obtained by the remote server after detecting that the attention of the first user is no longer diverted away from the media asset. For example, when the first user is paying attention to the soccer game again, the third user may generate an alert such as a voice alert, an electronic communication to the first user, a social media post, etc. The alert may be captured by the server, and the media guidance application may receive the alert from the server, and then determine that the alert contains the keyword that corresponds to the portion of the media asset in which the first user is interested. The media guidance application may play back the portion of the media asset in a similar manner as described herein with respect to the alert from the second user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
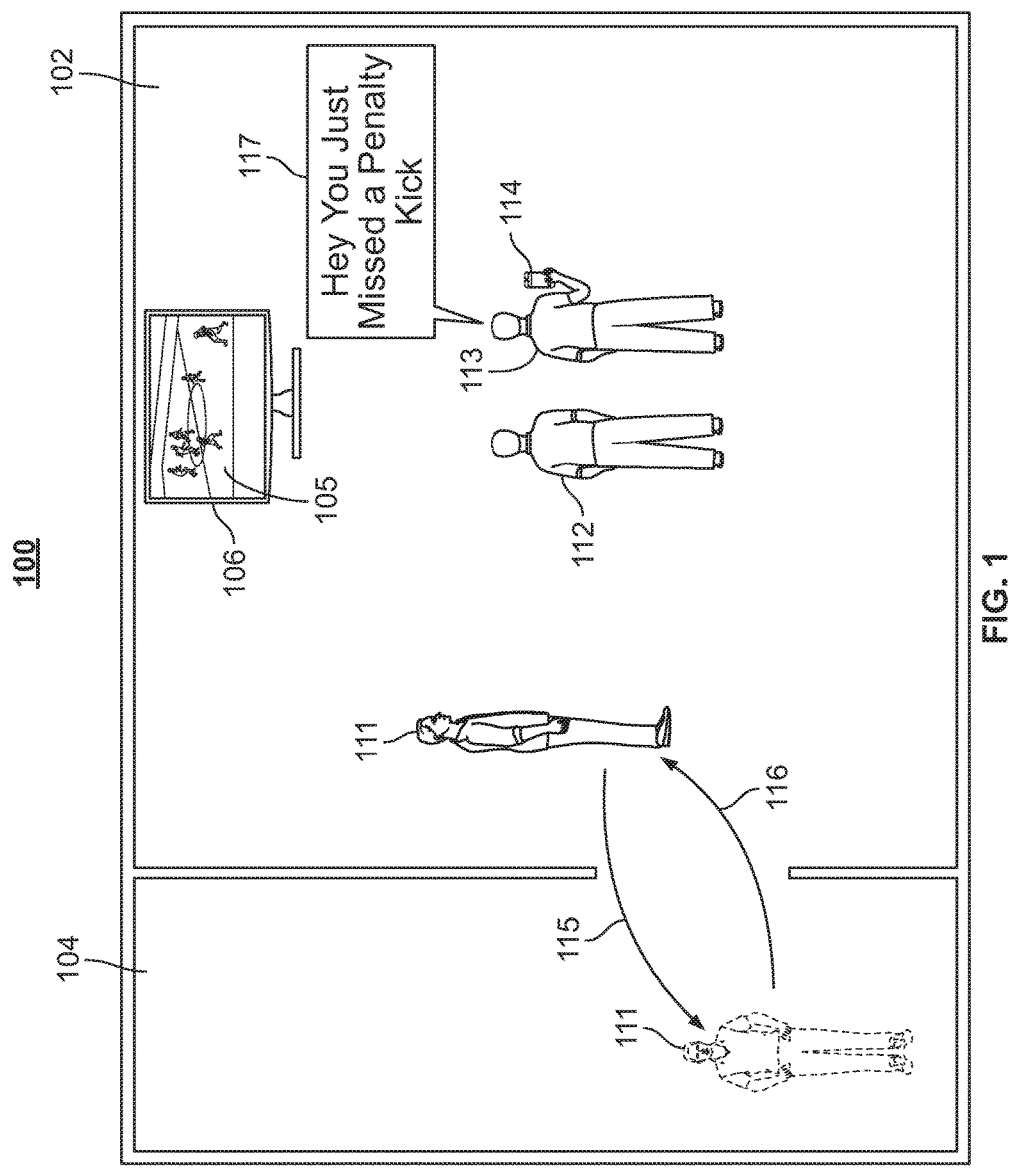
FIG. 1 depicts an illustrative diagram for automatically replaying a portion of a media asset to a user based on a voice alert from another user, in accordance with some embodiments of the disclosure.

Systems and methods are described herein for providing a media guidance application that automatically replays a portion of a media asset to a first user when a second user delivers an alert to the first user, and the alert is indicative of an event shown in the portion of the media asset, which occurred while attention of the first user was diverted away from the media asset. For example, a first user may walk away from a television screen while watching a live soccer game. When the first user walks back to the television screen, a second user who has been also watching the soccer game may shout out to the first user "hey, you just missed a penalty kick!" As another example, the second user may share an electronic communication with the first user to indicate the missed "penalty kick," or make a physical gesture such as a high five, a fist bump, and/or the like with the first user to indicate that the first user has missed content that may be of interest to the first user. A media guidance application that is part of a set-top box with the television may capture the voice alert from the second user and play back the portion of the game that includes the penalty kick. In this way, by performing the automatic replaying based on another user's voice alert, the media guidance application will be able to enhance user experience with the media asset, e.g., the user who has walked away from the media asset does not need to manually search and find a portion that he or she may be interested for playback. Moreover, as the automatic playback is analyzed and determined based on the feedback from the second user who has constant attention with the media asset, accuracy of identifying relevant portions of the media asset that the first user may be interested in is improved, and thus unnecessary playbacks can be reduced.

As used herein, the term "media guidance application" is defined to mean an application that provides guidance for a user to select or control the playing of a media asset or content. Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), notification information (e.g., text, images, media clips, etc.), on-demand information, blogs, websites, and any other type of guidance data that is helpful for a user to navigate among and locate desired content selections.

In some embodiments, control circuitry 404, discussed further in relation to FIG. 4 below, executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays discussed in relation to FIGS. 2-3. In some implementations, any action performed by control circuitry 404 may be based on instructions received from the media guidance application.

As referred to herein, the term "in response to" refers to initiated as a result of. For example, a first action being performed in response to a second action may include interstitial steps between the first action and the second action.

FIG. 1 depicts an illustrative diagram for automatically replaying a portion of a media asset to a user based on a voice alert from another user, in accordance with some embodiments of the disclosure. Environment 100 is depicted as a room 102 having user equipment 106 (e.g., user television equipment 502 as discussed further in relation to FIG. 5 below) and area 104, e.g., another room, that is separate from user equipment 106. User A 111, User B 112 and User C 113 are depicted in room 102, all in proximity to user equipment 106. User B 112 is depicted as holding user equipment 114 (e.g., user computer equipment 504 or wireless user communications device 506 as discussed further in relation to FIG. 5 below). User A 111 is also depicted, as shown in dotted line, at an alternative location in area 104 outside room 102.

In some embodiments, user equipment 106 may comprise control circuitry (e.g., control circuitry 404 discussed further in relation to FIG. 4 below) that executes a media guidance application for resizing content on a display device based on a relative importance of the content. User equipment 106, and/or 114 may have all the same capabilities of user television equipment 502, user computer equipment 504, and wireless user communications device 506 discussed further in relation to FIG. 5 below. A media asset 105, e.g., a live soccer game, which may be previously stored on and obtained from media content source 516 via communications network 514 as discussed further in relation to FIG. 5 below, may be played on user equipment 106.

In some embodiments, the media guidance application may detect that attention of User A 111 towards the media asset has been diverted away from the media asset, e.g., a soccer game being played on user equipment 106. As shown at 115, User A 111 may walk out of room 102 to arrive at a location in area 104, where User A 111 can no longer view the soccer game played on user equipment 106. For example, the media guidance application may engage a front-facing camera associated with user equipment 106 to detect that User A, is no longer in room 102, or the gaze of User A 111 has switched away from user equipment 106. For another example, the media guidance application may wirelessly communicate with a mobile device carried by User A 111, e.g., user equipment 114, to determine that User A 111 is no longer within a close physical range of user equipment 106. Embodiments of detecting whether the attention of a user has been diverted away from the media asset are described in greater detail in commonly owned and co-pending PCT International Application Nos. PCT/US2017/031755 and PCT/US2017/031765, both filed May 9, 2017, which are hereby incorporated by reference herein in their entireties.

In response to detecting that the attention of User A 111 has been diverted away from the media asset, the media guidance application may identify a user of relevance to User A 111, who is in proximity to user equipment 106, e.g., in room 102. As used herein, the term "user of relevance" to a respective user is defined to include any other user whose opinions on the media asset may have an influence on the respective user. For example, the user of relevance may be another user, who is in room 102 watching the same soccer game with User A 112, who has shared interests with User A 111, or who has a profile that is connected with a profile of User A 111, and/or the like.

In some embodiments, to identify the user of relevance to User A 111, the media guidance application may identify a number of users in proximity to user equipment 106. For example, the media guidance application may engage the front-facing camera to capture an image or a video of the audience scene in room 102, and then perform facial recognition on the image or the video to identify human faces in the watching scene. Further discussion of identifying users in a watching scene can be found in commonly owned and co-pending PCT International Application Nos. PCT/US2017/031755 and PCT/US2017/031765, both filed May 9, 2017, and PCT/US2017/031765, which are hereby incorporated by reference herein in their entireties. The media guidance application may identify a username corresponding to each identified human face in the watching scene, e.g., User A 111, User B 112, and User C 113 in room 102, and query a database of profiles on the usernames. For example, the database of user profiles may be located remote or local to the media guidance application (e.g., on storage 408 or on media guidance data source 518 accessed via communications network 514 described in relation to FIG. 4 and FIG. 5 below). The media guidance application may in turn obtain the profiles of User A 111, User B 112, and User C 113.

In some embodiments, the media guidance application may determine a respective relevance level of each respective identified user, User B 112 and User C 113 with respect to User A 111. For example, the media guidance application may access data fields or data entries in the profile that corresponding to a user's preferences on television show or sports teams. For another example, the media guidance application may analyze and obtain user preference information based on viewing history of a user. Further discussion of determining user preference information can be found in commonly owned and co-pending PCT International Application Nos. PCT/US2017/031755 and PCT/US2017/031765, both filed May 9, 2017, and PCT/US2017/031765, which are herein expressly incorporated by reference in their entireties. The media guidance application may compare the preference information of User B 112 and User C 113 with the preference information of User A 111, and calculate a respective overlap percentage of interests between User B 112 and User A 111, and between User C 113 and User A 111, respectively. The media guidance application may then identify the user who as the highest overlap percentage of interest, i.e., the relevance level with respect to User A 111. For example, if User A 111 and User B 112 have a percentage of 60% overlap in preference information, and User A 111 and User C 113 have a percentage of 55% overlap in preference information, then User B 112 is identified as a user of relevance to User A 111, because User B 112 has a higher overlap in preference information with User A 111 than User C 113.

In some embodiments, upon identifying User B 112 as the user of relevance to User A 111, the media guidance application may monitor a level of engagement of User B 112 with the media asset, e.g., the soccer game being played on user equipment 106. As used herein, the term "engagement" is defined to mean viewing and paying attention to an object, e.g., the media asset. For example, the media guidance application may employ the front-facing camera to capture the physical location, line of sight, movement, gesture, etc. The media guidance application may further employ an audio recorder to record vocal conversation from User B 112, ambient noise in room 102, or the like. The media guidance application may aggregate and analyze the monitoring data to determine a numeric value representing an engagement level of User B 112. Further discussion of determining whether one or more users are engaged in watching a media asset played on user equipment can be found in commonly owned and co-pending PCT International Application Nos. PCT/US2017/031755 and PCT/US2017/031765, both filed May 9, 2017, and PCT/US2017/031765, which are hereby incorporated by reference herein in their entireties.

In some embodiments, the media guidance application may determine, during the monitoring, a plurality of portions of the media asset for which the level of engagement of User B 112 exceeds an engagement threshold. For example, the engagement threshold can be a numeric value, e.g., 6.5/10, 5.5/10, etc.

In some embodiments, the engagement threshold may be determined upon the relevance level of User B 112 to User A 111. For example, when User B 112 has a low level of relevance to User A 111, User B 112 needs to be relatively more engaged in the soccer game in order to be considered as eligible to have influence on User A 111. Thus, the media guidance application may determine whether the relevance level of User B 112 is higher than a pre-determined relevance threshold. For example, a pre-determined relevance threshold of 65% is required for User B 112 to be considered as of relevance or influence to User A 111. Otherwise, User B needs to be intensely engaged in watching the soccer game to be considered as a user of relevance to User A 111. When the relevance level of User B 112 is higher than the pre-determined relevance threshold, a relatively lower value may be assigned to the engagement threshold, e.g., 4.5/10, 4.75/10, etc. When the relevance level of the second user is lower than the pre-determined relevance threshold, a relatively higher value may be assigned to the engagement threshold, e.g., 6.5/10, 6.75/10, etc. In this respective example, as the relevance level of User B, 60%, is lower than the relevance threshold of 65%, the media guidance application may assign a value of 6.5/10 to the engagement threshold.

In some embodiments, the media guidance application may generate, starting from a time mark when the level of engagement of User B exceeds the engagement threshold, a series of consecutive portions of the media asset. As used herein, the term "portion" is defined to mean a segment of the media asset, with a starting time and an ending time. Each portion has associated metadata including data indicative of the starting time, the ending time, the caption text, and/or the like. For example, the metadata associated with each portion of the media asset may be a structured data file that may take a form similar to the following:

<portion>
<portion_id> portion_001</portion_id>
<portion_index>14</portion_index>
<starting_time>14'25"</starting_time>
<ending_time>15'25"</ending_time>
<topic>
 <topic_1>"football"</topic_1>
 <topic_2>"Real Madrid"</topic_2>
 <topic_3>"penalty"</topic_3>
 . . .
</topic>
<caption>
<caption_start_time_1>14'25"</caption_start_time_1>
<caption_text_1>"Real Madrid has got a penalty"
</caption_text_1>
<caption_end_time_1>14'27"</caption_end_time_1>
 . . .
</caption>
 . . .
</portion>

The media guidance application may store the metadata associated with each portion either remotely or locally to the media guidance application (e.g., on storage 408 or on media guidance data source 518 accessed via communications network 514 described in relation to FIG. 4 and FIG. 5 below).

In some embodiments, the media guidance application may allocate an identical length to each of the plurality of portions, e.g., 1 minute, 2 minutes, 3 minutes, etc. Alternatively, the media guidance application may allocate different lengths to the plurality of portions of the media asset. For each respective portion of the plurality of portions, the media guidance application may annotate the respective portion of the media asset with a logical starting point and a logical ending point. As used herein, the term "logical starting point" of a respective portion is defined to mean a starting point to replay the respective portion that may or may not be the actual starting time of the respective portion. Similarly, the term "logical ending point" of a respective portion is defined to mean an ending point to replay the respective portion that may or may not be the actual ending time of the respective portion. For example, when a respective portion of 1 minute include content relating to a penalty goal in the soccer game, a user may also be interested in watching the foul that leads to the penalty kick together with the penalty goal. The foul may likely be included in a portion preceding the respective portion. In this case, the media guidance application may replay the respective portion by starting with the preceding portion that includes a replay of the foul. Thus the starting time of the preceding portion is the logical starting point of replaying the respective portion that includes the penalty goal.

In some embodiments, to annotate the respective portion of the media asset, the media guidance application may identify a start time and an end time of the respective portion of the media asset, e.g., by reading the relevant data section starting_time and ending_time in the metadata associated with the respective portion. The media guidance application may also determine, from the metadata, a plurality of topics corresponding to the media asset, e.g., by reading the relevant data entries topics in the metadata. In another example, the media guidance application may extract keywords from the text strings in the data entry caption as the topics of the program.

In addition to topics, the media guidance application may also determine attributes of the respective portion, by comparing each determined topic to an indication of electronic communication shared by users between the start time and the end time. As used herein, the term "attribute" is defined to mean words, tags or labels in any form that relate to the content of a portion of a media asset. As used herein, the term "electronic communication" is defined to mean any textual, visual, or audio communication message or streaming originated from any user equipment, including but not limited to text messages, multimedia messages, posts on social media (e.g., tweets, Facebook posts/likes, Instagram hashtags, YouTube posts, etc.), phone calls, electronic mails, and/or the like. The electronic communication may be obtained from data source 518 via communications network 514 as discussed in relation to FIG. 5.

In some embodiments, the media guidance application may then determine whether any topic is included in any electronic communication more than a threshold number of times. For example, for the topic "penalty" associated with a respective portion, the media guidance application may obtain user posts on social media during the time duration of the respective portion of the soccer game, e.g., tweets, Facebook posts, Instagram hashtags #penalty, etc. The media guidance application may then count how many times the topic "penalty" appears in the user posts during the duration of the respective portion of the soccer game. If the topic "penalty" has appeared for more than a threshold number of times, e.g., 2000, etc., the topic "penalty" is considered a trending topic corresponding to the respective portion. The media guidance application may then determine attributes of the respective portion, based on words included in the electronic communications that the topic "penalty" appeared. For example, if user posts that include the topic "penalty" frequently include words such as "goal," "Real Madrid," "Ronaldo," etc., these words may be determined as attributes of the respective portion of the soccer game, together with the topic "penalty." The media guidance application may store the determined attributes at storage 408 in FIG. 4 or data source 518 in FIG. 5.

The media guidance application may use the determined attributes of each portion of the soccer game to determine the logical starting point and/or the logical ending point of the respective portion. The media guidance application may retrieve a first preceding or subsequent portion that immediately precedes or follows the respective portion, e.g., by reading the data entry portion_index in the metadata of each portion to identify consecutive portions. The media guidance application may then compare attributes corresponding to the respective portion with attributes corresponding to the first preceding or subsequent portion to determine an overlap percentage. For example, attributes corresponding to the respective portion may include "penalty," "goal," "Real Madrid," etc., and attributes corresponding to the preceding portion may include "penalty," "foul," "Real Madrid," etc., then the two portions have overlapping attributes including at least "penalty" and "Real Madrid." The percentage of overlapping words and/or texts between attributes of the two portions is then calculated, e.g., two words out of three=66%. When the overlap percentage is lower than an overlap threshold (e.g., 60%, 70%, etc.), the preceding or subsequent portion is not considered to include an event that is highly related to the respective portion, and shall not be replayed together with the respective portion. Thus, the media guidance application may annotate the actual start time of the respective portion, by reading the data entry start_time from the metadata as the logical starting point, and append a data entry <logical_start_point>14'25"</logical_start_point> to the metadata of the respective portion.

If the overlap percentage of 66% is higher than the overlap threshold, the preceding portion is considered to include an event that is highly related to the respective portion and shall be replayed together with the respective portion. Then the media guidance application may keep retrieving a second preceding portion that immediately precedes the first preceding portion and repeat comparing attributes of the respective portion and attributes of the second preceding portion to determine whether the overlap percentage exceeds the overlap threshold. The media guidance application may continue retrieving as many preceding portions as the respective overlap percentage is higher than the overlap threshold. When the overlap percentage is no longer higher than the overlap threshold, the media guidance application may annotate a starting point of the current preceding portion as the logical starting point.

For example, if the respective portion has a portion_index of 14, the first preceding portion having a portion_index of 13 has an overlap percentage with the respective portion that is higher than the overlap threshold, but the second preceding portion having a portion_index of 12 has an overlap percentage with the respective portion that is lower than the overlap threshold, then the start time of the first preceding portion indexed as 13 is determined to be the logical starting point of the respective portion indexed as 14. Thus, when the respective portion indexed as 14 is to be replayed, the replay starts with the portion indexed as 13. The media guidance application may then append the data entry logical_start_point to the metadata of the respective portion.

Similarly, the media guidance application may determine a logic ending point for the respective portion by retrieving a subsequent portion until the overlap percentage between the attributes of the subsequent portion and the attributes of the respective portion is no higher than the overlap threshold. The media guidance application may determine the logical ending point of the respective portion as the actual end time of the last subsequent portion that has the overlap percentage higher than the overlap threshold. The media guidance application may then append the data entry logical_end_point to the metadata of the respective portion.

In some embodiments, the media guidance application may generate a subset of the plurality of portions of the soccer game that User A 111 may be interested in. The media guidance application may read preference information from the profile of User A, and compare the preference information with attributes corresponding to each portion from the plurality of portions of the soccer game. For example, for a respective portion that has attributes of "soccer," "Championship," "Real Madrid," "Barcelona," "ESPN," etc., the preference information from the profile of User A 111, such as "sports," "soccer," "Real Madrid," "basketball," etc., is compared against each attribute. The media guidance application may then determine whether any attribute from the attributes matches the preference information. In this example, the respective portion has at least two attributes "soccer" and "Real Madrid" that match the preference information of User A 111. When a match is identified, the media guidance application may determine, the respective portion of the soccer game as one that User A 111 is interested in, and then add the respective portion the subset of the plurality of portions. The similar comparing and match identification may be performed for each portion from the plurality of portions of the soccer game to generate the subset of portions that User A 111 is interested in.

In some embodiments, the media guidance application may detect that the attention of user A 111 is no longer diverted away from the media asset. For example, as shown at 116, User A 111 may physically get in proximity to user equipment 106 in room 102. Or User A 111 may turn his or her gaze to user equipment 106. In response to detecting that the attention of User A 111 is no longer diverted away from the media asset, the media guidance application may monitor for and detect a voice alert (e.g., via user input interface 410) relating to the media asset from User B 112 towards User A 111.

For example, the media guidance application may employ a video camera and/or an audio recorder to obtain audio or video recording in room 102. The media guidance application may then filter the audio recording at a range of spectrum of human voice to obtain a voice alert 117. The media guidance application may then determine whether the voice alert 117 is originated from User B 112, e.g., the user of relevance to User A 111. For example, the media guidance application may perform voice recognition on the voice alert based on a voice signature that is stored in the profile of User B 112. In another example, the media guidance application may perform facial recognition on the video recording to determine whether User B 112 has a movement or gesture to speak to User A 111, e.g., turning his or her head, hand gesture, etc.

The media guidance application may also perform speech recognition to extract one or more keywords from the voice alert "you just missed the penalty goal" 117. The keywords may include "penalty," "goal," etc. The media guidance application may then determine a portion from the subset of portions of the soccer game, to which the keyword corresponds. For example, for each respective portion of the subset, the media guidance application may compare attributes corresponding to the respective portion to the keyword "penalty" or "goal." If a respective portion of the media asset includes attributes that match "penalty" or "goal," the respective portion may be identified for potential playing back.

In some embodiments, the media guidance application may capture an alert in other formats other than a verbal statement from User B 112. For example, User B 112 may raise his or her hands during a goal when User A 111 was away, and may then engage in a mutual gesture with User A 112 (e.g., a high five, a fist bump) when User A 112 comes back to the watching scene, etc. The media guidance application may capture the sequence of non-verbal communications, e.g., "hand raising," "high five," "fist bump," and derive keywords that are indicative of the physical gesture, e.g., "hand raising," "high five," "fist bump." The media guidance application may identify that the physical alert "high five" or "fist bump" indicates an event of interest to User A 111 may have happened during the time when User A 111 was away, e.g., via a gesture table, etc. The media guidance application may then determine that a portion of the media asset corresponding to a time frame when the "hand raising" gesture occurred may be of interest to User A 111, because the physical alert "high five" or "fist bump" indicates a positive event happened.

In some embodiments, additional formats of the alert may include electronic messages from User B 112 to User A 111, electronic messages by other users shared on a public platform (e.g., social media posts shared during the time when User A 111 was away, etc.), and/or the like. Specifically, in a "virtual" or "distributed" social watching scenario as further discussed below, e.g., when User B 112 and User A 111 may not be at the same location with user equipment 106, the media guidance application may utilize a plurality of electronic messages shared between User B 112 and User A 111 or shared on a public platform to identify a portion of the media asset that may be of interest to User A 111.

In some embodiments, prior to playing back any portion from the subset of portions of the soccer game, the media guidance application may determine a projected interest level of User A 111 towards the portion of the soccer game which matches the keyword from the voice alert. For example, upon determining a portion of the soccer game that possibly includes "penalty" or "goal," the media guidance application may determine how interested User A 111 is to watch the playback of the portion. The media guidance application may determine a matching percentage by comparing attributes associated with the portion of the media asset with the preference information from the profile of User A. For example, if the portion that matches the keyword "penalty" or "goal" has a set of attributes including "penalty," "goal," "Real Madrid," "Ronaldo," and the preference information of User A's profile includes "Real Madrid," "Ronaldo," "basketball," etc., the portion has attributes that match 2/3 of User A's preferences. The media guidance application may assign a user interest matching score of 66% to the portion of the media asset, which indicates a similarity level to User A's interests.

The media guidance application may also consider how crucial any event included in the portion of the media asset is, by assigning, to the portion of the media asset, a cruciality score. As used herein, the term "crucial" or "cruciality" is defined to mean the generally perceived importance of an event, an item or an object. The cruciality score is a numeric value that is assigned to the event, the item or the object and is indicative of a level of the importance. For example, the media asset application may retrieve and query a pre-determined cruciality table based on the keyword "penalty" or "goal" to retrieve the corresponding cruciality score. The pre-determined cruciality table maps terms indicative of different events to different scores indicative of cruciality levels of the different events. For example, terms such as "penalty" or "goal" may be assigned to a high cruciality score, while terms such as "clear," "center," etc., may be assigned to a relatively lower cruciality score. An example cruciality table may take a form similar to the following:

TABLE 1

Example Cruciality Table

| Keyword | Cruciality Score |
| --- | --- |
| penalty | 0.8 |
| goal | 0.8 |
| clear | 0.3 |
| cornerkick | 0.6 |
| Time-out | 0.1 |
| . . . | . . . |

The media guidance application may store the pre-determined cruciality table either remotely or locally to the media guidance application (e.g., on storage 408 or on media guidance data source 518 accessed via communications network 514 described in relation to FIG. 4 and FIG. 5 below).

The media guidance application may then determine the projected interest level by taking a weighted sum of the user interest matching score and the cruciality score. For example, a first weight of 0.5 may be used to apply to the user interest matching score and a second weight of 0.5 may be used to apply to the cruciality score. The first weight and the second weight may be dynamically adjusted, depending on a relative emphasis on user interests or the cruciality of the event. For example, when the media asset is a live sports event, the media guidance application may configure a higher weight for the cruciality score to emphasize crucial events in the live game. In another example, when the media asset is a reality television show, the media guidance application may configure a higher weight for the user interest matching score to emphasize user interests matching in replaying.

In some embodiments, in response to determining the projected interest level of User A 111 towards the portion of the media asset is higher than a pre-determined interest threshold, the media guidance application may play back the portion of the media asset on user equipment 106 to User A 111. For example, the media guidance application may temporarily interrupt the soccer game or any other program that is being played, and play back the portion on user equipment 106. In response to determining that the projected interest level of User A 111 towards the portion of the media asset is lower than the pre-determined interest threshold, the media guidance application may temporarily refrain from playing back the portion of the media asset on user equipment 106.

In some embodiments, the media guidance application may also temporarily refrain from play back the portion of the media asset, if the current program being played on user equipment 106 is crucial. The media guidance application may extract one or more topics attributes from metadata associated with the media asset at a first time instant when the voice alert is captured. The media guidance application may then determine a first cruciality level of the media asset at the first time. For example, the media guidance application may read the topic section of the metadata of the soccer game at the first time, and obtain a topic as "offside." The media guidance application may then query the pre-determined cruciality table based on the topic "offside" to retrieve a cruciality score of 0.3. In response to determining that the cruciality level (e.g., 0.3) of the media asset at the first time is lower than a pre-determined cruciality threshold (e.g., 0.5, etc.), the media asset application may play back the portion of the media asset at the first time. In another example, if the media guidance application extracts a topic "corner kick" from the media asset that is being played at the first time, and retrieve a cruciality score associated with "corner kick" from the cruciality table, e.g., 0.65, which is higher than the cruciality threshold of 0.5, the media guidance application may refrain from playing back the portion of the media asset at the first time.

When the media guidance application refrains from playing back the portion of the media asset at the first time, the media guidance application may wait for a short period of time (e.g., 2 minutes, etc.) until a second time, and determine a second cruciality level of the media asset at the second time in a similar manner as determining the first cruciality level of the media asset at the first time. For example, if a topic of the media asset at the second time indicates "offside," which may have a cruciality score of 0.3 that is lower than the pre-determined cruciality threshold (e.g., 0.5), the media guidance application may play back the portion of the media asset at the second time.

In some embodiments, the media guidance may allow User B 112 to manually select a portion for playing back to Use A 111, if no portion from the subset of the plurality of portions of the media asset matches the keyword. The media guidance application may wirelessly transmit, to user equipment 114, e.g., a mobile device, associated with User B 112, a plurality of playback options representing the plurality of portions of the media asset for which the level of engagement of User B 112 exceeds the engagement threshold. For example, User B 112 may receive on user equipment 114 a list of video icons, each representing a portion of the soccer game that User B has been engaged in watching during the time when User A has been not paying attention. The list of video icons may take a form similar to listings 306, 308, 310 and 312 on display 300 as further discussed in relation to FIG. 4. The media guidance application may receive, from user equipment 114 (e.g., via user input interface 410 as further discussed in relation to FIG. 4), a selection from the plurality of playback options. For example, User B may scroll the list of video icons, and tap on an icon for replay. The media guidance application may then play back, on user equipment 106 that the media asset has been played on, a selected portion from the plurality of portions of the media asset corresponding to the selection.

In some embodiments, the media guidance application may form a "virtual" or "distributed" social watching environment. For example, a number of users may watch the media asset at different locations; at each location, a media guidance application, e.g., installed with user equipment 106 at each location, may monitor user activities indicative of user engagement level at the respective location, and send the monitoring data to a remote server. The remote server may thus utilize the monitoring data of users who may be remote to each other, to obtain information to determine missed content for a user, e.g., User A 111 even when no user of relevance to User A 111 is proximate to User A 111, or in room 102. For example, User A 111 may be alone in room 102 watching the soccer game, or none of User B 112 and User C 113 in room 102 with User A 111 is determined to have a relevance level higher than the relevance threshold. Or none of User B 112 and User C 113 in room 102 has been intensely engaged in watching the soccer game, each having an engagement level lower than the engagement threshold. In these scenarios, in response to determining that no user of relevance to User A 111 is proximate to user equipment 106, e.g., no other user is present with User A 111 in room 102 at all, or users present in room 102 are either not paying attention to the soccer game or are not relevant to User A 111 to have an influence on User A 111 on the soccer game, the media guidance application may resort to remote users who are not present in room 102, but are engaging in watching the soccer game at the same time. The media guidance application may transmit a request, to the remote server that is physically remote from Users A, B or C, or room 102, for monitoring data of another user of relevance to User A who has been engaged in watching the same media asset. For example, the request may be sent via the communications network 514 to a remote server that is communicatively connected to data sources 516 and 518, as further discussed in relation to FIG. 5. The request may take a form similar to a (Secure) Hypertext Transfer Protocol ("HTTP(S)") message in the form formatted to the eXtensible Markup Language (XML) as follows:

POST/user_of_relevance_request.php HTTP/1.1
Host: 192.168.23.126
Content-Type: Application/XML
Content-Length:878
<?XML version="1.0" encoding="UTF-8"?>
<user_of_relevance_request>
<request_id>001</request_id>
<timestamp>15:22:43</timestamp>
. . .
<user_info>
  <user_id> User A</user_id>
  <user_name> John Doe </user_name>
  <device_id> HTC_JD</device_id>
  . . .
</user_info>
<media_asset>

```
<asset_id> ESPN-007</asset_id>
<channel> ESPN </channel>
 . . .
</media_asset>
<-!optional>
<engagement_threshold>0.5</engagement_threshold>
<degree_of_separation>3</degree_of_separation>
 . . .
</user_of_relevance>
```
As shown in the above example request message, the media guidance application may optionally include parameters such as the engagement threshold, a desired degree of separation for the remote server to locate a remote user of relevance.

The server may in turn identify a remote user of relevance, for example, a user who has a profile that is connected to the profile of User A 111 and has been engaged in watching the soccer game at a location remote to room 102. The identified user also has with a level of engagement with the soccer game that exceeds the pre-determined engagement threshold of 0.5. In response to transmitting the request to the remote server, the media guidance application may receive, from the remote server, information relating to an alert relating to the media asset from the identified remote user of relevance. The alert may be obtained by the remote server after detecting that the attention of User A 111 is no longer diverted away from the media asset, e.g., when User A is paying attention to the soccer game again. The alert generated by the remote user of relevance may include any of a voice alert, a physical gesture, an electronic communication to User A, a social media post shared on a public platform, etc. The alert may be sent to the remote server, and the media guidance application may receive the alert from the server. Once the alert is obtained by the media guidance application, the media guidance application may analyze the alert to extract keywords in a similar manner as the media guidance application extracts keywords from a voice alert of a local user of relevance, e.g., User B 112. The media guidance application may then determine a portion of the media asset for playback in a similar manner as describer herein, and in turn play back the portion of the media asset.

Figure 2:
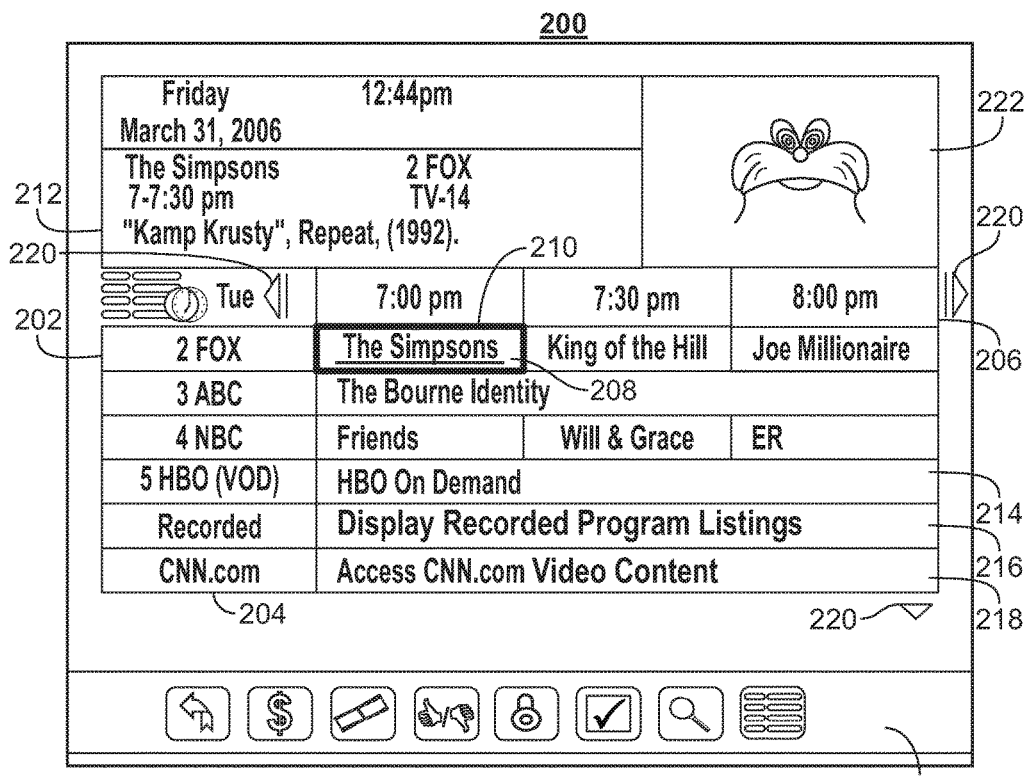
FIG. 2 shows an illustrative embodiment of a display screen that may be used to provide media guidance application listings and other media guidance information, in accordance with some embodiments of the disclosure.
Figure 3:
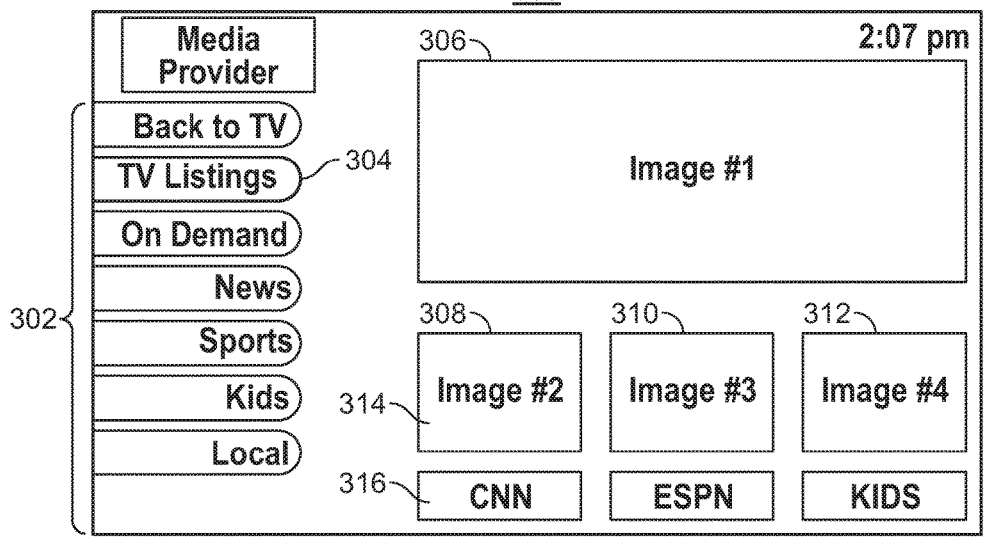
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform, e.g., user equipment 106 or 114 in FIG. 1. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
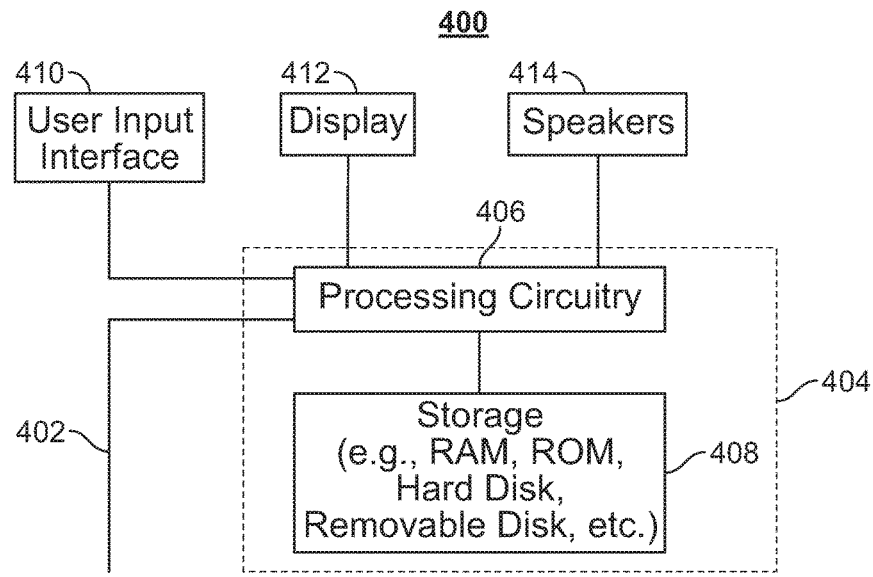
FIG. 4 is a block diagram of an illustrative user equipment (UE) device in accordance with some embodiments of the disclosure.
Figure 5:
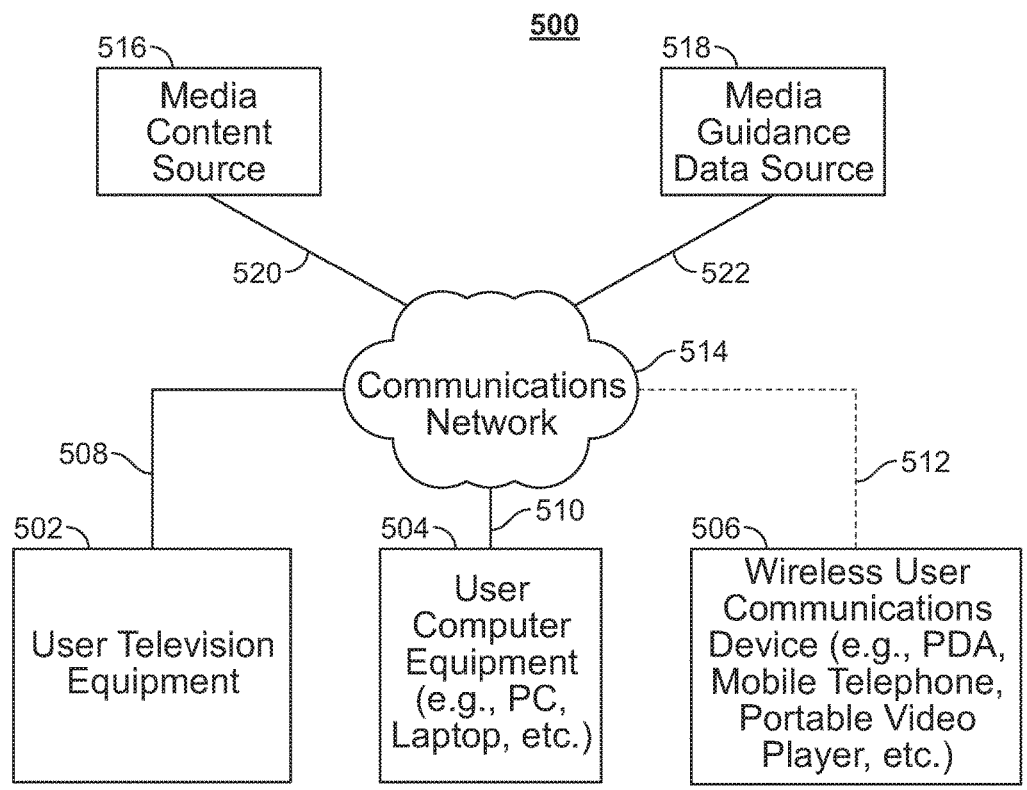
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
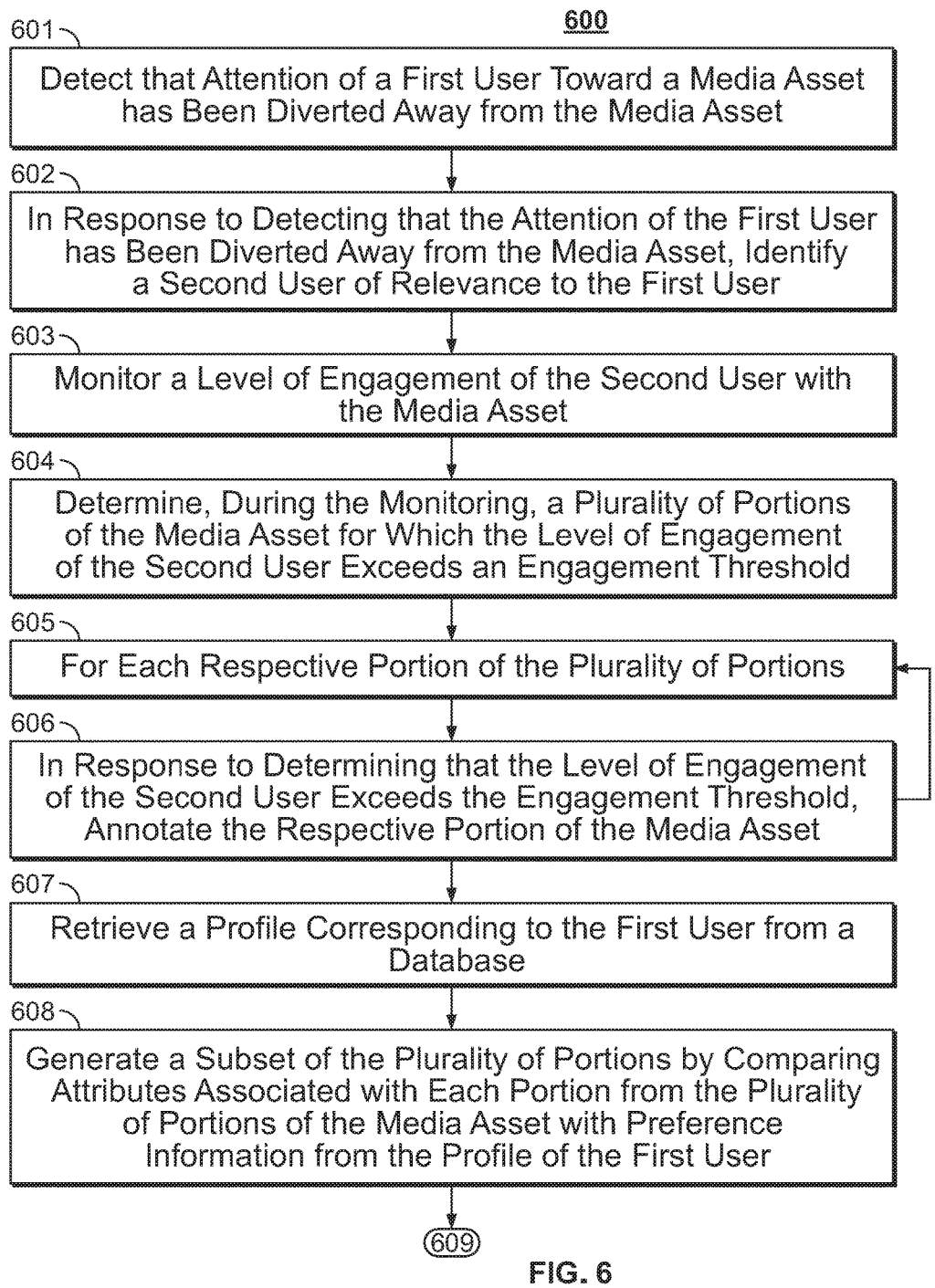
FIG. 6 depicts an illustrative flowchart of a process for automatically replaying a portion of a media asset to a first user when a second user delivers an alert to the first user that is indicative of the portion of the media asset, in accordance with some embodiments of the disclosure.
Figure 6:
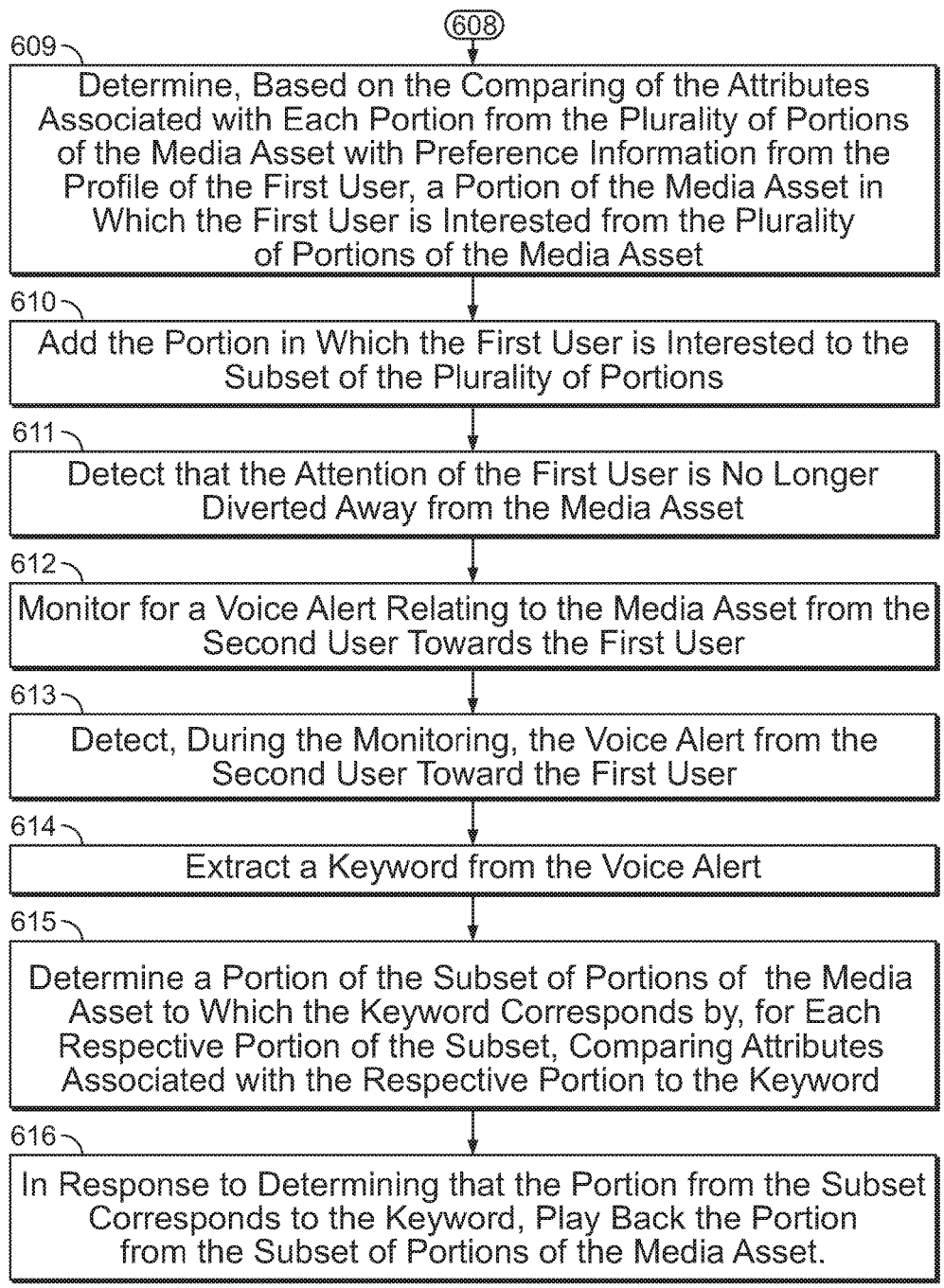

FIG. 6 depicts an illustrative flowchart of a process for automatically replaying a portion of a media asset to a first user when a second user delivers a voice alert to the first user that is indicative of the portion of the media asset, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 600 begins at 601, where control circuitry 404 detects that attention of a first user (e.g., User A 111 in FIG. 1) toward a media asset has been diverted away from the media asset (e.g., the media asset 105 that is provided by data source 516 via communications network 514 in FIG. 5 and is played on user equipment 106 in FIG. 1, and/or via the display 412 in FIG. 2, or any of 502, 504 and 506 in FIG. 5). At 602, control circuitry 404, in response to detecting that the attention of the first user has been diverted away from the media asset, identifies a second user (e.g., User B 112 in FIG. 1) of relevance to the first user. At 603, control circuitry 404 monitors a level of engagement of the second user with the media asset. At 604, control circuitry 404 determines, during the monitoring, a plurality of portions of the media asset for which the level of engagement of the second user exceeds an engagement.

Process 600 continues to 605, where for each respective portion of the plurality of portions, at 606, control circuitry 404 annotates the respective portion of the media asset. Process 600 repeats at 605 and 606 until each respective portion of the plurality of portions have been annotated by the control circuitry 404. The control circuitry 404 stores the annotated portions and/or the metadata associated therewith locally at storage 408 in FIG. 4, or remotely at data source 518 via communications network 514 in FIG. 5.

Process 600 then continues to 607, where control circuitry 404 retrieves a profile corresponding to the first user from a database (e.g., from storage 408 in FIG. 4, or data sources 516, 518 in FIG. 5). At 608, control circuitry 404 generates a subset of the plurality of portions, by comparing attributes associated with each portion from the plurality of portions of the media asset with preference information from the profile of the first user.

Process 600 then continues to 609, where control circuitry 404 determines, based on the comparing of the attributes associated with each portion from the plurality of portions of the media asset with preference information from the profile of the first user (e.g., User A 111 in FIG. 1), a portion of the media asset in which the first user is interested from the plurality of portions of the media asset.

At 610, control circuitry 404 adds the portion in which the first user is interested to the subset of the plurality of portions.

At 611, control circuitry 404 detects that the attention of the first user is no longer diverted away from the media asset (e.g., User A 111 walks back to room 102 at 116 in FIG. 1). At 612, control circuitry 404 monitors for a voice alert (e.g., via user input interface 410 in FIG. 4) relating to the media asset from the second user towards the first user. At 613, control circuitry 404 detects (e.g., via user input interface 410 in FIG. 4), during the monitoring, the voice alert from the second user toward the first user. At 614, control circuitry 404 extracts a keyword from the voice alert. At 615, control circuitry 404 determines a portion of the subset of portions of the media asset to which the keyword corresponds by, for each respective portion of the subset, comparing attributes associated with the respective portion to the keyword. At 616, control circuitry 404 plays back the portion from the subset of portions of the media asset (e.g., via display 412 in FIG. 4).

Figure 7:
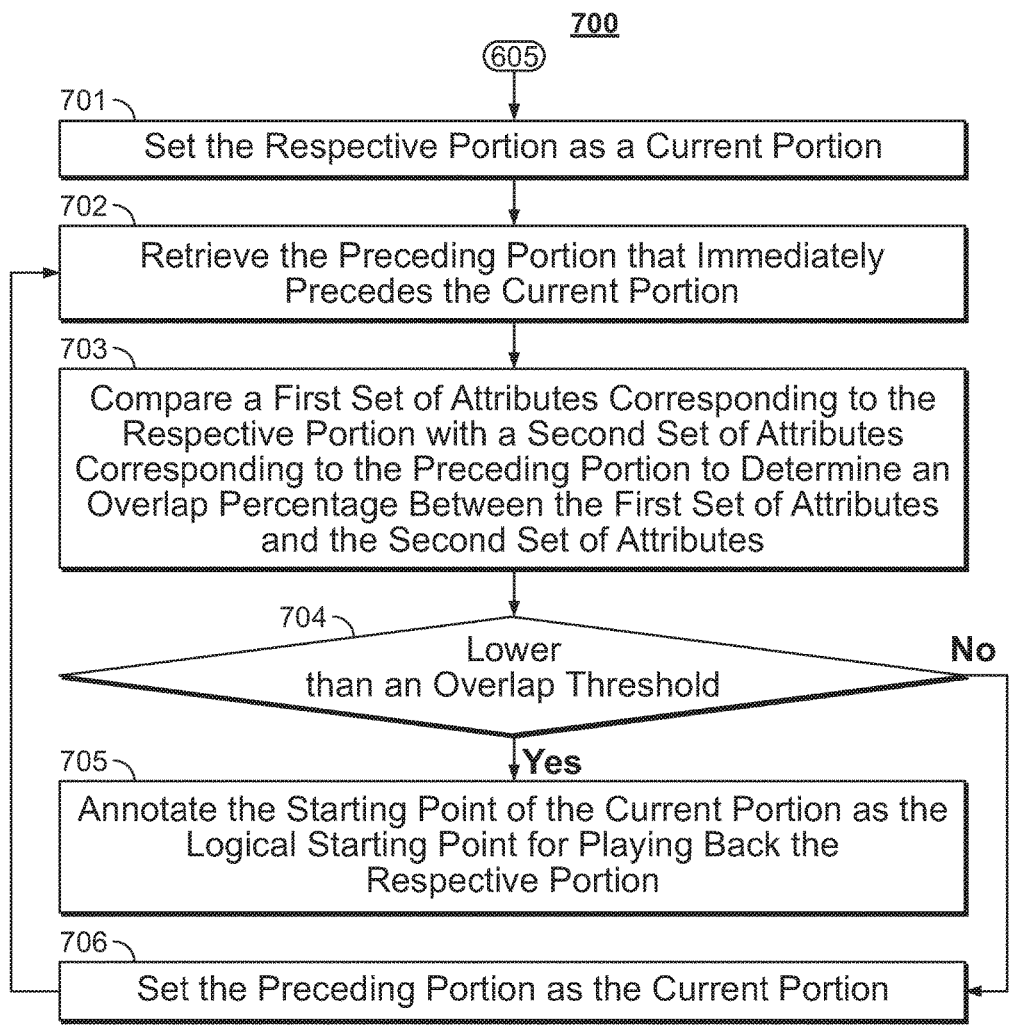
FIG. 7 depicts an illustrative flowchart of a process for annotating a respective portion of the media asset, in accordance with some embodiments of the disclosure.

FIG. 7 depicts an illustrative flowchart of a process for annotating a respective portion of the media asset, in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 700 begins at 701, which continues and inherits parameters such as the respective portion of the media asset (e.g., stored at RAM storage 408 in FIG. 4) from 605 in FIG. 6. At 701, control circuitry 404 sets the respective portion as a current portion for the iterative process in the following. At 702, control circuitry 404 retrieves the preceding portion that immediately precedes the current portion. At 703, control circuitry 404 compares a first set of attributes corresponding to the respective portion with a second set of attributes corresponding to the preceding portion to determine an overlap percentage between the first set of attributes and the second set of attributes. At 704, if the overlap percentage is lower than an overlap threshold, process 700 continues to 705. At 705, control circuitry 404 annotates the starting point of the current portion as the logical starting point for playing back the respective portion. Back at 704, if the overlap percentage is no lower than the overlap threshold, process 700 continues to 706. At 706, control circuitry 404 sets the preceding portion as the current portion. Process 700 then continues from 706 to 702. Thus, process 700 repeats 702-704 until the overlap percentage between the first set of attributes corresponding to the respective portion and the second set of attributes corresponding to the preceding portion that precedes the current portion is lower than the overlap threshold, and then process 700 ends at 705. At 705, control circuitry 404 stores the logical starting point in the metadata of the respective portion at storage 408 in FIG. 4 or at data source 518 via communications network 514 in FIG. 5.

Figure 8:
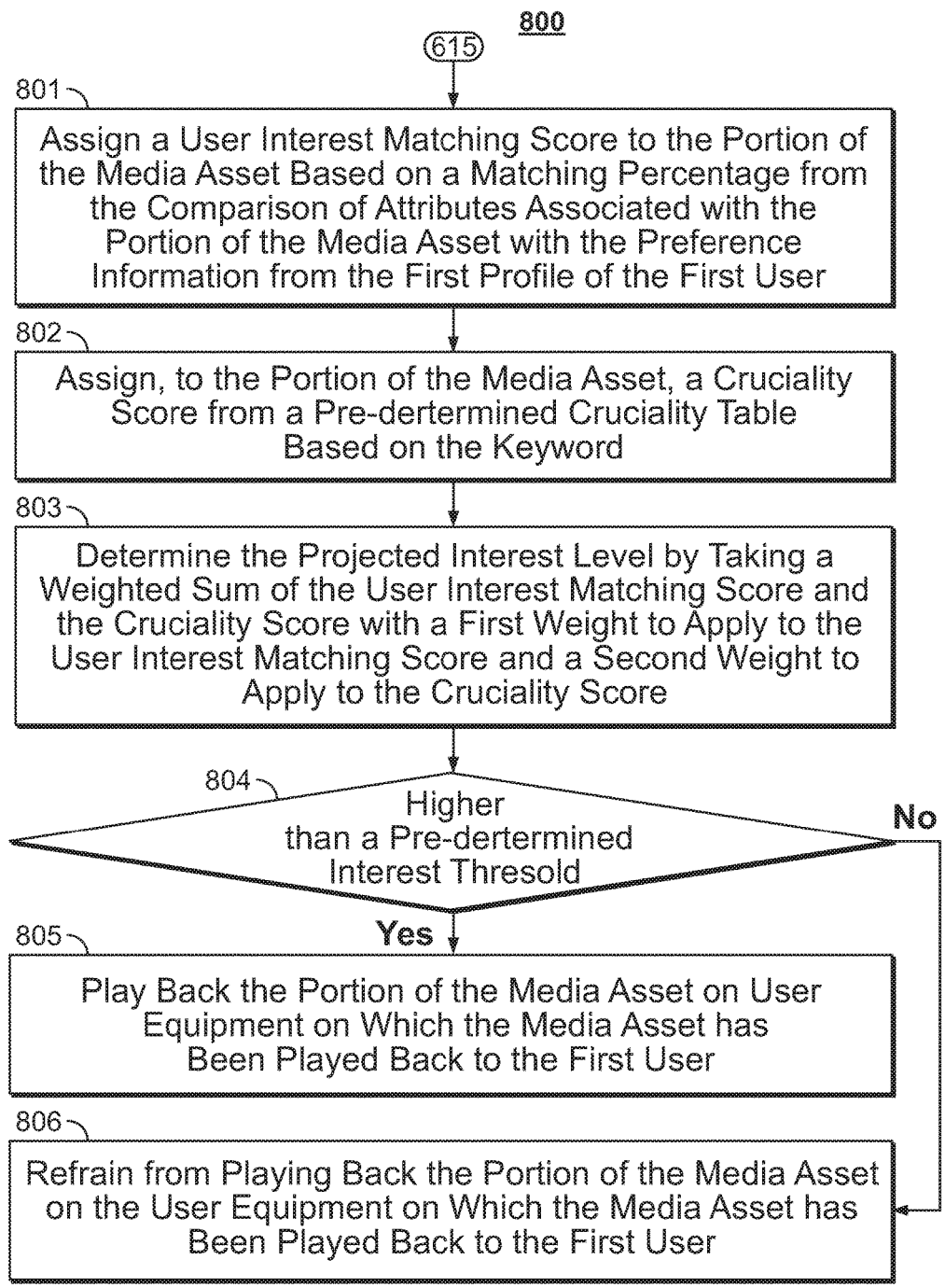
FIG. 8 depicts an illustrative flowchart of a process for determining when to play back, to the first user, a portion of the media asset that matches a keyword from an alert from the second user, in accordance with some embodiments of the disclosure.

FIG. 8 depict an illustrative flowchart of a process for determining when to play back, to the first user, a portion of the media asset that matches a keyword from a voice alert from the second user, in accordance with some embodiments of the disclosure. Process 800 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 800 begins at 801, which continues and inherits parameters such as the portion from the subset of portions of the media asset that corresponds to the keyword (e.g., stored at RAM of storage 208 in FIG. 4) from 615 in FIG. 6. At 801, control circuitry 404 assigns a user interest matching score to the portion of the media asset based on a matching percentage from the comparison of attributes associated with the portion of the media asset with the preference information from the first profile of the first user. At 802, control circuitry 404 assigns, to the portion of the media asset, a cruciality score from a pre-determined cruciality table (e.g., stored at storage 408 in FIG. 4 or data sources 516, 518 in FIG. 5) based on the keyword. At 803, control circuitry 404 determines a projected interest level by taking a weighted sum of the user interest matching score and the cruciality score, with a first weight to apply to the user interest matching score and a second weight to apply to the cruciality score. At 804, control circuitry 404 determines whether the projected interest level of the first user towards the portion of the media asset is higher than a pre-determined interest threshold. If the projected interest level playing is higher than the pre-determined interest threshold, process 800 continues to 805. At 805, control circuitry 404 plays back the portion of the media asset on user equipment (e.g., user equipment 106 which may have any or all of the functionality of user television equipment 502, user computer equipment 504, and/or wireless communications device 506) on which the media asset has been played back to the first user. If the projected interest level playing is no higher than the pre-determined interest threshold, process 800 continues to 806. At 806, control circuitry 404 refrains from playing back the portion of the media asset on the user equipment on which the media asset has been played back to the first user.

Figure 9:
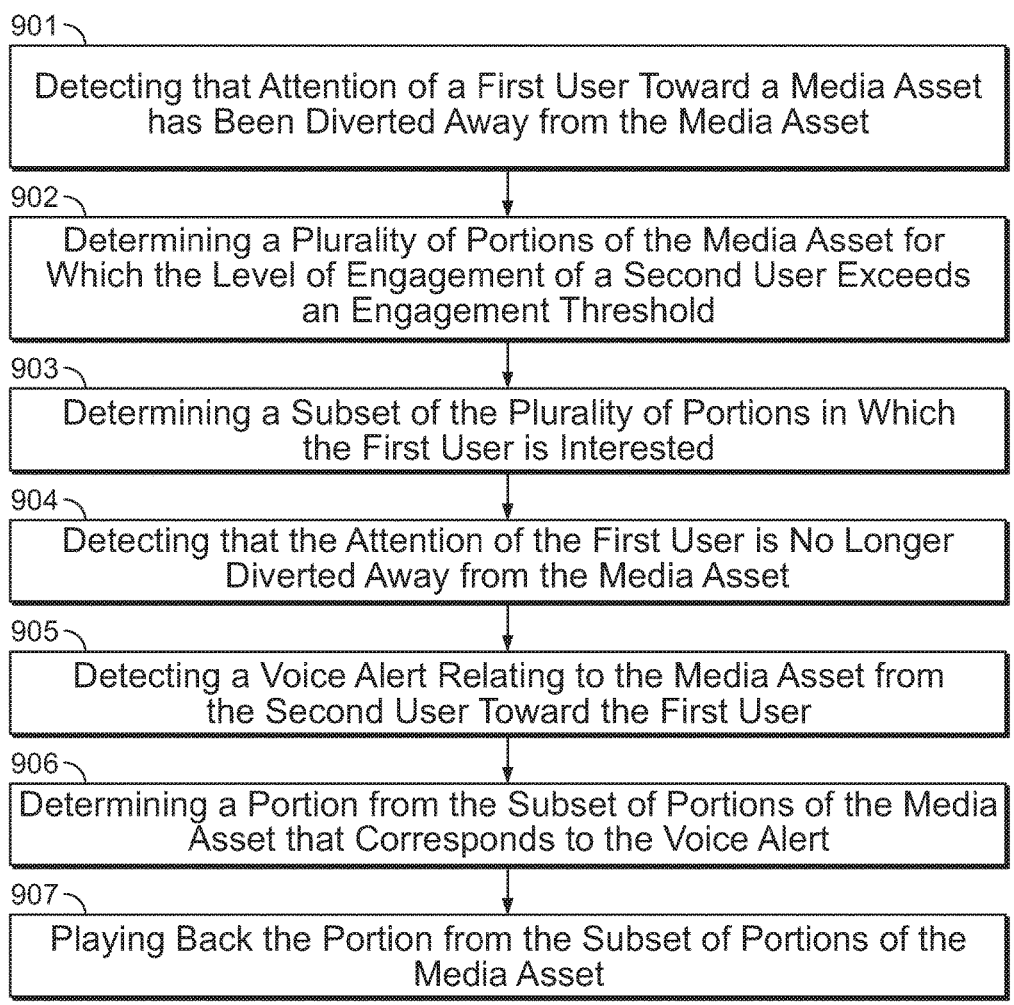
FIG. 9 depicts an illustrative flowchart of a process for replaying a portion of a media asset to a user based on an alert from another user, in accordance with some embodiments of the disclosure.

FIG. 9 depicts an illustrative flowchart of a process for replaying a portion of a media asset to a user based on a voice alert from another user, in accordance with some embodiments of the disclosure. Process 900 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 900 begins at 901, where control circuitry 404 detects that attention of a first user (e.g., User A 111 in FIG. 1) toward a media asset has been diverted away from the media asset (e.g., the media asset 105 that is provided by data source 516 via communications network 514 in FIG. 5 and is played on user equipment 106 in FIG. 1, and/or via the display 412 in FIG. 2, or any of 502, 504 and 506 in FIG. 5). At 902, control circuitry 404, in response to detecting that the attention of the first user has been diverted away from the media asset, determines a plurality of portions of the media asset for which the level of engagement of the second user exceeds an engagement.

Process 600 continues to 903, where control circuitry 404 determines a subset of the plurality of portions in which the first user is interested. At 904, control circuitry 404 detects that the attention of the first user is no longer diverted away from the media asset (e.g., User A 111 walks back to room 102 at 116 in FIG. 1). At 905, control circuitry 404 detects (e.g., via user input interface 410 in FIG. 4) a voice alert from the second user toward the first user. At 906, control circuitry 404 determines a portion of the subset of portions of the media asset that corresponds to the voice alert. At 907, control circuitry 404 plays back the portion from the subset of portions of the media asset (e.g., via display 412 in FIG. 4), in response to determining the portion of the subset of portions of the media asset that corresponds to the voice alert.

It should be noted that processes 600-900 or any step thereof could be performed on, or provided by, any of the devices shown in, or described with respect to, FIGS. 1 and 4-5. For example, any of processes 600-900 may be executed by control circuitry 404 (FIG. 4) as instructed by control circuitry implemented on user equipment 106 (FIG. 1), 502, 504, 506 (FIG. 5), and/or a user equipment 114 (FIG. 1) for selecting a portion of the media asset for replaying. In addition, one or more steps of processes 600-900 may be incorporated into or combined with one or more steps of any other process or embodiment.

It is contemplated that the steps or descriptions of each of FIGS. 6A-9 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, annotating each respective portion of the media asset may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, each annotated portion of the media asset and the metadata associated therewith, as described herein, may be stored in, and retrieved from, storage 408 of FIG. 4, or media guidance data source 518 of FIG. 5. Furthermore, processing circuitry, or a computer program, may update configuration data of the media guidance application, which may be stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for automatically replaying a portion of a media asset to a first user when a second user delivers an alert to the first user that is indicative of the portion of the media asset, where the portion initially was played back while attention of the first user was diverted away from the media asset, the method comprising:
   detecting that attention of a first user toward a media asset has been diverted away from the media asset;
   in response to detecting that the attention of the first user has been diverted away from the media asset, identifying a second user of relevance to the first user;
   computing a level of engagement of the second user with the media asset based on monitoring data relating to the second user captured by audio or image capturing circuitry;
   determining, during the monitoring, a plurality of portions of the media asset for which the level of engagement of the second user exceeds an engagement threshold;
   for each respective portion of the plurality of portions, in response to determining that the level of engagement of the second user exceeds the engagement threshold, annotating the respective portion of the media asset;
   retrieving a profile corresponding to the first user from a database;
   generating a subset of the plurality of portions by:
      comparing attributes associated with each portion from the plurality of portions of the media asset with preference information from the profile of the first user;
      determining, based on the comparing of the attributes associated with each portion from the plurality of portions of the media asset with preference information from the profile of the first user, a portion of the media asset in which the first user is interested from the plurality of portions of the media asset; and
      adding the portion in which the first user is interested to the subset of the plurality of portions;
   detecting that the attention of the first user is no longer diverted away from the media asset;
   in response to detecting that the attention of the first user is no longer diverted away from the media asset, monitoring, via the audio or image capturing circuitry, for an alert relating to the media asset from the second user towards the first user;
   detecting, during the monitoring, the alert from the second user toward the first user;
   deriving a keyword from the alert,
   determining a portion of the subset of portions of the media asset to which the keyword corresponds by, for each respective portion of the subset, comparing attributes associated with the respective portion to the keyword; and
   in response to determining that the portion from the subset corresponds to the keyword, playing back the portion from the subset of portions of the media asset.

2. The method of claim 1, wherein identifying the second user of relevance to the first user comprises:
   identifying a plurality of users in proximity to user equipment on which the media asset is played back to the first user;
   retrieving, from the database, a plurality of profiles, each profile of the plurality of profiles corresponding to a user of the plurality of users;
   determining a respective relevance level of each respective user from the plurality of users with respect to the first user by comparing preference information in the profile of the first user and preference information in each respective profile of the respective user; and
   identifying the second user as having a highest relevance level among the plurality of users with respect to the first user.

3. The method of claim 2, further comprising:
   determining whether the relevance level of the second user is higher than a pre-determined relevance threshold;

in response to determining that the relevance level of the second user is higher than the pre-determined relevance threshold, assigning a first value to the engagement threshold; and in response to determining that the relevance level of the second user is lower than the pre-determined relevance threshold, assigning a second value higher than the first value to the engagement threshold.

4. The method of claim 1, wherein obtaining attributes corresponding to each portion of the plurality of portions of the media asset comprises, for each respective portion from the plurality of portions of the media asset:

identifying a start time and an end time of the respective portion;

determining, from metadata corresponding to the media asset, a plurality of topics corresponding to the media asset;

comparing each topic of the plurality of topics to an indication of electronic communications shared by users between the start time and the end time;

determining, based on comparing each topic of the plurality of topics to the indication, that a topic of the plurality of topics was included in the electronic communications between the start time and the end time more than a threshold number of times; and determining, based on words included in the electronic communications between the start time and the end time that include the topic, the attributes of the respective portion.

5. The method of claim 1, wherein annotating the respective portion of the media asset comprises:

retrieving a first preceding portion that immediately precedes the respective portion;

comparing a first set of attributes corresponding to the respective portion with a second set of attributes corresponding to the first preceding portion to determine a first overlap percentage between the first set of attributes and the second set of attributes;

in response to determining that the first overlap percentage is lower than an overlap threshold, annotating a starting point of the respective portion as a logical starting point for playing back the respective portion;

in response to determining that the first overlap percentage is higher than the overlap threshold, retrieving a second preceding portion that immediately precedes the first preceding portion, and determining a second overlap percentage between the first set of attributes and a third set of attributes corresponding to the second preceding portion; and in response to determining that the second overlap percentage is lower than the overlap threshold, annotating a starting point of the first preceding portion as the logical starting point for playing back the respective portion.

6. The method of claim 1, wherein comparing the attributes associated with each portion from the plurality of portions of the media asset with preference information from the profile of the first user comprises:

retrieving the preference information from the profile;

comparing the preference information with each attribute from the attributes corresponding to a respective portion from the plurality of portions;

determining whether any attribute from the attributes matches the preference information; and in response to determining that an attribute from the attributes matches the preference information, identifying the respective portion of the media asset that the attribute corresponds to as the portion in which the first user is interested.

7. The method of claim 1, further comprising:

prior to playing back the portion from the subset of portions of the media asset, determining a projected interest level of the first user towards the portion of the media asset which matches the keyword from the alert by:

assigning a user interest matching score to the portion of the media asset based on a matching percentage from the comparison of attributes associated with the portion of the media asset with the preference information from the first profile of the first user;

assigning, to the portion of the media asset, a cruciality score from a pre-determined cruciality table based on the keyword, the pre-determined cruciality table mapping terms indicative of different events to different scores indicative of cruciality levels of the different events;

determining the projected interest level by taking a weighted sum of the user interest matching score and the cruciality score with a first weight to apply to the user interest matching score and a second weight to apply to the cruciality score, the first weight and the second weight being dynamically adjustable;

in response to determining the projected interest level of the first user towards the portion of the media asset is higher than a pre-determined interest threshold, playing back the portion of the media asset on user equipment on which the media asset has been played back to the first user; and in response to determining that the projected interest level of the first user towards the portion of the media asset is lower than the pre-determined interest threshold, refrain from playing back the portion of the media asset on the user equipment on which the media asset has been played back to the first user.

8. The method of claim 7, further comprising:

extracting one or more attributes from metadata associated with the media asset at a first time when the alert is captured;

determining a first cruciality level of the media asset at the first time by retrieving one or more corresponding cruciality scores from the pre-determined cruciality table based on the one or more attributes;

in response to determining that the first cruciality level of the media asset at the first time is higher than a pre-determined cruciality threshold, refraining from playing back the portion of the media asset at the first time; and determining a second cruciality level of the media asset at a second time that is later than the first time;

in response to determining that the second cruciality level of the media asset at the second time is lower than the pre-determined cruciality threshold, playing back the portion of the media asset at the second time.

9. The method of claim 1, further comprising:

in response to determining that no portion from the subset of the plurality of portions of the media asset matches the keyword, transmitting, to a mobile device associated with second user, a plurality of playback options representing the plurality of portions of the media asset for which the level of engagement of the second user exceeds a engagement threshold;

receiving, from the mobile device, a selection from the plurality of playback options; and playing back, on a display device that the media asset has been played on, a selected portion from the plurality of portions of the media asset corresponding to the selection.

10. The method of claim 1, wherein identifying the second user of relevance to the first user comprises:
   determining that no user of relevance to the first user is proximate to the first user;
   in response to determining that no user of relevance to the first user is proximate to the first user, transmitting a request, to a remote server that is physically remote from the first user or the second user, for monitoring data of a third user who has a profile of the third user that is connected to the profile of the first user and has a second level of engagement with the media asset that exceeds the pre-determined engagement threshold, the third user being physically remote from the first user or the second user;
   in response to transmitting the request to the remote server, receiving, from the remote server, information relating to an alert relating to the media asset from the third user, the alert being obtained by the remote server after detecting that the attention of the first user is no longer diverted away from the media asset; and
   in response to determining that the alert contains the keyword that corresponds to the portion of the media asset in which the first user is interested, playing back the portion of the media asset.

11. A system for automatically replaying a portion of a media asset to a first user when a second user delivers an alert to the first user that is indicative of the portion of the media asset, where the portion initially was played back while attention of the first user was diverted away from the media asset, the system comprising:
   communication circuitry;
   audio or image capturing circuitry; and
   control circuitry configured to:
      detect that attention of a first user toward a media asset has been diverted away from the media asset;
      in response to detecting that the attention of the first user has been diverted away from the media asset, identify a second user of relevance to the first user;
      compute a level of engagement of the second user with the media asset based on monitoring data relating to the second user captured by the audio or image capturing circuitry;
      determine, during the monitoring, a plurality of portions of the media asset for which the level of engagement of the second user exceeds an engagement_threshold;
      for each respective portion of the plurality of portions, in response to determining that the level of engagement of the second user exceeds the engagement threshold, annotate the respective portion of the media asset;
      retrieve, via the communication circuitry, a profile corresponding to the first user from a database;
      generate a subset of the plurality of portions by:
         comparing attributes associated with each portion from the plurality of portions of the media asset with preference information from the profile of the first user;
         determining, based on the comparing of the attributes associated with each portion from the plurality of portions of the media asset with preference information from the profile of the first user, a portion of the media asset in which the first user is interested from the plurality of portions of the media asset; and
         adding the portion in which the first user is interested to the subset of the plurality of portions;
      detect that the attention of the first user is no longer diverted away from the media asset;
      in response to detecting that the attention of the first user is no longer diverted away from the media asset, monitor, via the audio or image capturing circuitry, for an alert relating to the media asset from the second user towards the first user;
      detect during the monitoring, the alert from the second user toward the first user;
      derive a keyword from the alert,
      determine a portion of the subset of portions of the media asset to which the keyword corresponds by, for each respective portion of the subset, comparing attributes associated with the respective portion to the keyword; and
      in response to determining that the portion from the subset corresponds to the keyword, play back the portion from the subset of portions of the media asset.

12. The system of claim 11, wherein the control circuitry is further configured, when identifying the second user of relevance to the first user, to:
   identify a plurality of users in proximity to user equipment on which the media asset is played back to the first user;
   retrieve, from the database, a plurality of profiles, each profile of the plurality of profiles corresponding to a user of the plurality of users;
   determine a respective relevance level of each respective user from the plurality of users with respect to the first user by comparing preference information in the profile of the first user and preference information in each respective profile of the respective user; and
   identify the second user as having a highest relevance level among the plurality of users with respect to the first user.

13. The system of claim 12, wherein the control circuitry is further configured to:
   determine whether the relevance level of the second user is higher than a pre-determined relevance threshold;
   in response to determining that the relevance level of the second user is higher than the pre-determined relevance threshold, assign a first value to the engagement threshold; and
   in response to determining that the relevance level of the second user is lower than the pre-determined relevance threshold, assign a second value higher than the first value to the engagement threshold.

14. The system of claim 11, wherein the control circuitry is further configured, when determining attributes corresponding to each portion of the plurality of portions of the media asset comprises, for each respective portion from the plurality of portions of the media asset, to:
   identify a start time and an end time of the respective portion;
   determine, from metadata corresponding to the media asset, a plurality of topics corresponding to the media asset;
   compare each topic of the plurality of topics to an indication of electronic communications shared by users between the start time and the end time;
   determine, based on comparing each topic of the plurality of topics to the indication, that a topic of the plurality of topics was included in the electronic communications between the start time and the end time more than a threshold number of times; and determine, based on words included in the electronic communications between the start time and the end time that include the topic, the attributes of the respective portion.

15. The system of claim 11, wherein the control circuitry is further configured, when annotating the respective portion of the media asset, to:
retrieve a first preceding portion that immediately precedes the respective portion;
compare a first set of attributes corresponding to the respective portion with a second set of attributes corresponding to the first preceding portion to determine a first overlap percentage between the first set of attributes and the second set of attributes;
in response to determining that the first overlap percentage is lower than an overlap threshold, annotate a starting point of the respective portion as a logical starting point for playing back the respective portion;
in response to determining that the first overlap percentage is higher than the overlap threshold, retrieve a second preceding portion that immediately precedes the first preceding portion, and determining a second overlap percentage between the first set of attributes and a third set of attributes corresponding to the second preceding portion; and
in response to determining that the second overlap percentage is lower than the overlap threshold, annotate a starting point of the first preceding portion as the logical starting point for playing back the respective portion.

16. The system of claim 11, wherein the control circuitry is further configured, when comparing the attributes associated with each portion from the plurality of portions of the media asset with preference information from the profile of the first user, to:
retrieve the preference information from the profile;
compare the preference information with each attribute from the attributes corresponding to a respective portion from the plurality of portions;
determine whether any attribute from the attributes matches the preference information; and
in response to determining that an attribute from the attributes matches the preference information, identify the respective portion of the media asset that the attribute corresponds to as the portion in which the first user is interested.

17. The system of claim 11, wherein the control circuitry is further configured to:
prior to playing back the portion from the subset of portions of the media asset, determine a projected interest level of the first user towards the portion of the media asset which matches the keyword from the alert by:
assigning a user interest matching score to the portion of the media asset based on a matching percentage from the comparison of attributes associated with the portion of the media asset with the preference information from the first profile of the first user;
assigning, to the portion of the media asset, a cruciality score from a pre-determined cruciality table based on the keyword, the pre-determined cruciality table mapping terms indicative of different events to different scores indicative of cruciality levels of the different events; and
determining the projected interest level by taking a weighted sum of the user interest matching score and the cruciality score with a first weight to apply to the user interest matching score and a second weight to apply to the cruciality score, the first weight and the second weight being dynamically adjustable;
in response to determining the projected interest level of the first user towards the portion of the media asset is higher than a pre-determined interest threshold, play back the portion of the media asset on user equipment on which the media asset has been played back to the first user; and
in response to determining that the projected interest level of the first user towards the portion of the media asset is lower than the pre-determined interest threshold, refrain from playing back the portion of the media asset on the user equipment on which the media asset has been played back to the first user.

18. The system of claim 17, wherein the control circuitry is further configured to:
extract one or more attributes from metadata associated with the media asset at a first time when the alert is captured;
determine a first cruciality level of the media asset at the first time by retrieving one or more corresponding cruciality scores from the pre-determined cruciality table based on the one or more attributes;
in response to determining that the first cruciality level of the media asset at the first time is higher than a pre-determined cruciality threshold, refrain from playing back the portion of the media asset at the first time;
determine a second cruciality level of the media asset at a second time that is later than the first time; and
in response to determining that the second cruciality level of the media asset at the second time is lower than the pre-determined cruciality threshold, play back the portion of the media asset at the second time.

19. The system of claim 11, wherein the control circuitry is further configured to:
in response to determining that no portion from the subset of the plurality of portions of the media asset matches the keyword, transmit, to a mobile device associated with second user, a plurality of playback options representing the plurality of portions of the media asset for which the level of engagement of the second user exceeds a engagement threshold;
receive, from the mobile device, a selection from the plurality of playback options; and
play back, on a display device that the media asset has been played on, a selected portion from the plurality of portions of the media asset corresponding to the selection.

20. The system of claim 11, wherein the control circuitry is further configured, when identifying the second user of relevance to the first user, to:
determine that no user of relevance to the first user is proximate to the first user;
in response to determining that no user of relevance to the first user is proximate to the first user, transmit a request, to a remote server that is physically remote from the first user or the second user, for monitoring data of a third user who has a profile of the third user that is connected to the profile of the first user and has a second level of engagement with the media asset that exceeds the pre-determined engagement threshold, the third user being physically remote from the first user or the second user;
in response to transmitting the request to the remote server, receive, from the remote server, information relating to an alert relating to the media asset from the third user, the alert being obtained by the remote server after detecting that the attention of the first user is no longer diverted away from the media asset; and in response to determining that the alert contains the keyword that corresponds to the portion of the media asset in which the first user is interested, play back the portion of the media asset.

\* \* \* \* \*